US012749711B2

(12) United States Patent
Lee et al.

(10) Patent No.: US 12,749,711 B2
(45) Date of Patent: Sep. 29, 2026

(54) LITHIUM SECONDARY BATTERY

(71) Applicant: LG Energy Solution, Ltd., Seoul (KR)

(72) Inventors: Jae Won Lee, Daejeon (KR); Jung Hoon Lee, Daejeon (KR); Chul Haeng Lee, Daejeon (KR); Yoo Sun Kang, Daejeon (KR); Sol Ji Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 728 days.

(21) Appl. No.: 17/967,195

(22) Filed: Oct. 17, 2022

(65) Prior Publication Data

US 2023/0121761 A1 Apr. 20, 2023

(30) Foreign Application Priority Data

Oct. 19, 2021 (KR) ........................ 10-2021-0139182

(51) Int. Cl.

| | |
|---|---|
| ***H01M 10/0567*** | (2010.01) |
| ***H01M 4/525*** | (2010.01) |
| ***H01M 10/0525*** | (2010.01) |
| ***H01M 10/0569*** | (2010.01) |
| *H01M 4/02* | (2006.01) |
| *H01M 10/42* | (2006.01) |

(52) U.S. Cl.

CPC ....... *H01M 10/0567* (2013.01); *H01M 4/525* (2013.01); *H01M 10/0525* (2013.01); *H01M 10/0569* (2013.01); *H01M 2004/028* (2013.01); *H01M 10/4235* (2013.01); *H01M 2300/0037* (2013.01)

(58) Field of Classification Search

CPC ......... H01M 10/0567; H01M 10/0569; H01M 2300/0037; H01M 4/525; H01M 10/0525; H01M 2004/028; H01M 10/4235

See application file for complete search history.

(56) References Cited

U.S. PATENT DOCUMENTS

| | | | |
|---|---|---|---|
| 2010/0021815 | A1 | 1/2010 | Oh et al. |
| 2018/0358655 | A1 | 12/2018 | Kono et al. |
| 2020/0044287 | A1 | 2/2020 | Kim et al. |
| 2020/0251777 | A1 | 8/2020 | Lim et al. |
| 2021/0057780 | A1 | 2/2021 | Oh et al. |
| 2022/0223911 | A1 | 7/2022 | Kim et al. |
| 2022/0376303 | A1 | 11/2022 | Lim et al. |

FOREIGN PATENT DOCUMENTS

| | | | | |
|---|---|---|---|---|
| CN | 111900474 | A | | 11/2020 |
| CN | 112886059 | A | | 6/2021 |
| CN | 113363585 | A | | 9/2021 |
| CN | 113381071 | A | | 9/2021 |
| EP | 3944392 | A1 | | 1/2022 |
| JP | 2000-268859 | A | | 9/2000 |
| JP | 2003086247 | A | | 3/2003 |
| JP | 2008166271 | A | | 7/2008 |
| JP | 2013-232298 | | * | 11/2013 |
| JP | 2013232298 | A | | 11/2013 |
| JP | 2017168347 | A | | 9/2017 |
| JP | 2017183013 | A | | 10/2017 |
| JP | 2017183014 | A | | 10/2017 |
| JP | 2020528640 | A | | 9/2020 |
| JP | 2021513188 | A | | 5/2021 |
| JP | 2022-129682 | | * | 9/2022 |
| KR | 20030061219 | A | | 7/2003 |
| KR | 100884479 | B1 | | 2/2009 |
| KR | 20170132239 | A | | 12/2017 |
| KR | 20190008100 | A | | 1/2019 |
| KR | 2020-0036789 | A | | 4/2020 |
| WO | 2013038842 | A1 | | 3/2013 |
| WO | WO 2013/038842 | | * | 3/2013 |
| WO | 2015-037382 | A1 | | 3/2015 |
| WO | 2021034141 | A1 | | 2/2021 |

OTHER PUBLICATIONS

Extended European Search Report for Application No. 22884029.4 dated Jul. 7, 2025. 6 pages.

* cited by examiner

*Primary Examiner* — Laura Weiner

(74) *Attorney, Agent, or Firm* — Lerner David LLP

(57) ABSTRACT

The present disclosure relates to a lithium secondary battery including: a non-aqueous electrolyte including a lithium salt, an organic solvent, a first additive represented by Chemical Formula 1 and a second additive represented by Chemical Formula 2; a positive electrode including a positive electrode active material including a lithium composite transition metal oxide having a nickel content of 70 mol % or more among a total transition metal content; a negative electrode including an negative electrode active material; and a separator interposed between the positive electrode and the negative electrode.

16 Claims, No Drawings

LITHIUM SECONDARY BATTERY

CROSS-REFERENCE TO RELATED APPLICATION

This application claims priority from Korean Patent Application No. 10-2021-0139182, filed on Oct. 19, 2021, the disclosures of which are incorporated by reference herein.

BACKGROUND OF THE INVENTION

The present disclosure relates to a lithium secondary battery including an electrolyte containing a specific additive combination and a high-nickel positive electrode material.

In lithium secondary batteries, an electrode assembly is generally formed by interposing a separator between a positive electrode including a positive electrode active material made of a transition metal oxide containing lithium, and a negative electrode including a negative electrode active material capable of storing lithium ions, and the lithium secondary battery is manufactured by inserting the electrode assembly into a battery case, injecting a non-aqueous electrolyte as a medium for transferring lithium ions, and then sealing the electrode assembly.

Lithium secondary batteries can be miniaturized and have high energy density and operating voltage, so they are being applied to various fields such as mobile devices, electronic products, and electric vehicles. As the field of application of the lithium secondary battery is diversified, the required physical property conditions are also gradually increasing, and in particular, there is a demand for the development of a lithium secondary battery that can be stably driven even under high temperature conditions.

Meanwhile, when a lithium secondary battery is driven under high temperature conditions, the $PF_6^-$ anion may be thermally decomposed from a lithium salt such as $LiPF_6$ contained in the electrolyte to generate a Lewis acid such as $PF_5$, which reacts with moisture to generate HF. Decomposition products such as $PF_5$ and HF may not only destroy the film formed on the electrode surface, but also cause a decomposition reaction of the organic solvent.

In addition, the electrolyte decomposition product may react with the decomposition product of the positive electrode active material to elute transition metal ions, and the eluted transition metal ions may be electrodeposited on the negative electrode to destroy the film formed on the surface of the negative electrode, thereby further lowering battery performance.

In particular, when the nickel content in the positive electrode active material is increased to implement a high-capacity battery, the initial capacity characteristics are improved, but when charging and discharging are repeated, a large amount of highly reactive $Ni^{4+}$ ions are generated, resulting in the structural collapse of the positive electrode active material, so that there is a problem in that the degradation rate of the battery increases.

Accordingly, there is a demand for the development of a secondary battery capable of maintaining excellent performance even under high temperature conditions while including a high-nickel positive electrode material.

RELATED ART DOCUMENT

Patent Document

KR 10-2003-0061219 A

BRIEF SUMMARY OF THE INVENTION

An object of the present disclosure is to solve the above problems, and to provide a lithium secondary battery including a high-nickel positive electrode active material with improved high temperature performance by introducing a non-aqueous electrolyte containing a combination of two specific additives.

According to one embodiment, the present disclosure provides a lithium secondary battery including:

- a non-aqueous electrolyte including a lithium salt, an organic solvent, a first additive represented by the following Chemical Formula 1 and a second additive represented by the following Chemical Formula 2;
- a positive electrode including a positive electrode active material including a lithium composite transition metal oxide having a nickel content of 70 mol % or more among a total transition metal content;
- a negative electrode including a negative electrode active material; and
- a separator interposed between the positive electrode and the negative electrode;

[Chemical Formula 1]

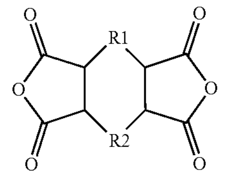

wherein,

R1 and R2 are each independently a direct bond; or an alkylene group having 1 to 5 carbon atoms;

[Chemical Formula 2]

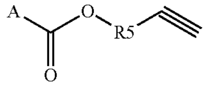

wherein,

A is —NR3R4, a nitrogen-containing heterocyclic group having 3 to 5 carbon atoms or a nitrogen-containing heteroaryl group having 3 to 5 carbon atoms, R3 and R4 are each independently an alkyl group having 1 to 5 carbon atoms, and R5 is an alkylene group having 1 to 3 carbon atoms.

The lithium secondary battery according to the present disclosure can exhibit excellent high-temperature stability by including an electrolyte including a combination of specific additives while including a high-nickel (High-Ni) positive electrode active material.

DETAILED DESCRIPTION OF THE INVENTION

Hereinafter, the present disclosure will be described in more detail.

In general, anions included in lithium salts such as $LiPF_6$, which are widely used in electrolytes for lithium secondary batteries, form decomposition products such as hydrogen fluoride (HF) and $PF_5$ due to thermal decomposition or moisture. These decomposition products have acid properties and deteriorate the film or electrode surface in the battery.

Due to the decomposition product of the electrolyte and the structural change of the positive electrode due to repeated charging and discharging, etc., the transition metals in the positive electrode are easily eluted into the electrolyte, and the eluted transition metal is redeposited again on the positive electrode to increase the resistance of the positive electrode. In addition, when the eluted transition metal moves to the negative electrode through the electrolyte, electrodeposition on the negative electrode causes destruction of the solid electrolyte interphase (SEI) film and an additional electrolytic decomposition reaction, which cause problems such as consumption of lithium ions and increased resistance.

In addition, upon initial activation of the battery, a protective film is formed on the positive electrode and the negative electrode by an electrolyte reaction, and when the film becomes unstable for the above reason, further decomposition of the electrolyte occurs upon charging and discharging or high-temperature exposure to promote degradation of the battery and generate gas.

In particular, in the case of a battery including a positive electrode active material having a high nickel content, initial capacity characteristics are improved, but when charging and discharging are repeated, lithium by-products and gas generation due to side reactions may increase, and the decomposition reaction of the electrolyte may be intensified.

In order to solve this problem, the present inventors included a first additive represented by the following Chemical Formula 1 and a second additive in which a reduction reaction occurs at a higher potential than the first additive in the non-aqueous electrolyte, and this allows the gas reduction effect of the first additive to be maximized by first forming a film of the second additive during initial charging. Further, in the case of the second additive, by inhibiting the formation of HF by binding to $PF_5$, it is possible to prevent the destruction of the cathode electrolyte interphase (CEI) film formed on the positive electrode surface due to the first additive, thereby maximizing the effect of the first additive, and inhibiting additional electrolyte decomposition reaction.

Hereinafter, each configuration constituting the present disclosure will be described in more detail.

Non-Aqueous Electrolyte

The lithium secondary battery according to the present disclosure includes a non-aqueous electrolyte including a lithium salt, an organic solvent, a first additive represented by the following Chemical Formula 1 and a second additive represented by the following Chemical Formula 2.

Hereinafter, each component of the non-aqueous electrolyte will be specifically described.

(1) First Additive and Second Additive

The non-aqueous electrolyte of the present disclosure includes a first additive represented by the following Chemical Formula 1.

[Chemical Formula 1]

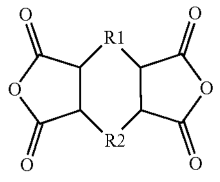

wherein,

R1 and R2 are each independently a direct bond; or an alkylene group having 1 to 5 carbon atoms.

Because the first additive represented by Chemical Formula 1 has a structure including succinic anhydride, a film is formed on the negative electrode during initial charging, and thereafter, since the film can be formed while being decomposed on the positive electrode surface in a high potential state, it is effective for reducing the amount of gas generated in the battery.

In one embodiment of the present disclosure, R1 and R2 in Chemical Formula 1 are each independently a direct bond; or a straight-chain or branched alkylene group having 1 to 5 carbon atoms.

In one embodiment of the present disclosure, R1 and R2 in Chemical Formula 1 are each independently a direct bond; or a straight-chain alkylene group having 1 to 5 carbon atoms.

In one embodiment of the present disclosure, R1 and R2 in Chemical Formula 1 are each independently a direct bond; or a methylene group.

In one embodiment of the present disclosure, in Chemical Formula 1, R1 may be a direct bond, and R2 may be an alkylene group having 1 to 5 carbon atoms.

In one embodiment of the present disclosure, in Chemical Formula 1, R1 may be a direct bond, and R2 may be a methylene group.

In one embodiment of the present disclosure, the first additive may be represented by the following Chemical Formula 1A.

[Chemical Formula 1A]

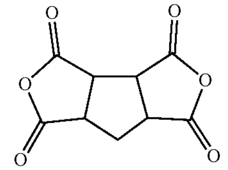

In one embodiment of the present disclosure, the content of the first additive may be in a range of 0.01 wt % to 5 wt %, preferably 0.5 wt % to 3 wt %, more preferably 1.5 wt % to 2.5 wt %, based on the total weight of the non-aqueous electrolyte. It is preferable that the content of the first additive is 5 wt % or less in terms of reducing gas generated during battery driving and minimizing an increase in battery resistance.

The non-aqueous electrolyte of the present disclosure includes a second additive represented by the following Chemical Formula 2.

[Chemical Formula 2]

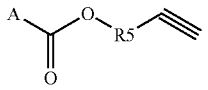

wherein,

A is —NR3R4, a nitrogen-containing heterocyclic group having 3 to 5 carbon atoms or a nitrogen-containing heteroaryl group having 3 to 5 carbon atoms, R3 and R4 are each independently an alkyl group having 1 to 5 carbon atoms, and R5 is an alkylene group having 1 to 3 carbon atoms.

Since the second additive represented by Chemical Formula 2 includes a propargyl functional group, the functional group is reduced and decomposed to form an SEI film having high passivation ability on the surface of the negative electrode, thereby improving the high temperature durability of the negative electrode itself and preventing the electrodeposition of transition metals on the surface of the negative electrode. In addition, due to the propargyl group, it is possible to be adsorbed on the surface of the metallic impurity contained in the positive electrode and function to make the elution of the impurity difficult, thereby suppressing an internal short circuit that may occur due to deposition of the eluted metal ion on the negative electrode.

Furthermore, since the second additive has a higher potential at which the reduction reaction occurs at the negative electrode as compared with the first additive, a second additive is first consumed at the time of initial charging to form a film on the negative electrode, so that a large amount of unreduced first additive remains in the initial charging, and then a film is formed on the surface of the positive electrode by oxidative decomposition of the first additive at a high potential, and side reactions between the positive electrode and the electrolyte are suppressed, whereby the gas reduction effect may be maximized.

Specifically, the reduction potential of the first additive may be 1.1V to 1.3V, and the reduction potential of the second additive may be in a range of 1.5V to 1.7V. In the present invention, the reductive potential may be the reduction decomposition potential and measured by the method described in Experimental Example 1 below.

In one embodiment of the present disclosure, the second additive may be represented by the following Chemical Formula 2-1 or 2-2.

[Chemical Formula 2-1]

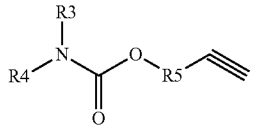

[Chemical Formula 2-2]

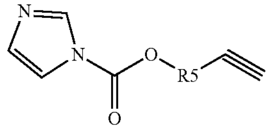

wherein,

R3 to R5 are as defined in Chemical Formula 2 above.

In one embodiment of the present disclosure, A in Chemical Formula 2 may be a nitrogen-containing heteroaryl group having 3 to 5 carbon atoms, and preferably, the second additive may be represented by Chemical Formula 2-2.

In one embodiment of the present disclosure, R5 in Chemical Formula 2 may be a straight-chain or branched alkylene group having 1 to 3 carbon atoms, preferably a straight-chain alkylene group having 1 to 3 carbon atoms, more preferably a methylene group.

In one embodiment of the present disclosure, the second additive may be represented by the following Chemical Formula 2A.

[Chemical Formula 2A]

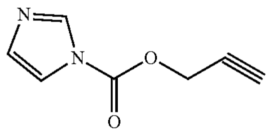

In one embodiment of the present disclosure, the content of the second additive may be in a range of 0.01 wt % to 5 wt %, preferably 0.5 wt % to 3 wt %, more preferably 1.5 wt % to 2.5 wt %, based on the total weight of the non-aqueous electrolyte. The content of the second additive is preferably 5 wt % or less in terms of minimizing an increase in resistance of the battery while forming a negative electrode film.

In addition, the content of the first additive and the content of the second additive are each 1 wt % or more, preferably 1.5 wt % or more, more preferably 2 wt % or more, based on the total weight of the non-aqueous electrolyte. In this case, there is an effect of not only reducing the amount of gas generated in the battery but also decreasing the voltage drop. However, it is preferable that the content of the first additive and the content of the second additive are each 5 wt % or less in terms of preventing an increase in battery resistance.

In one embodiment of the present disclosure, the weight ratio of the first additive and the second additive in the non-aqueous electrolyte may be in range of 1:2 to 2:1, preferably 1:1 to 2:1.

(2) Third Additive

The non-aqueous electrolyte of the present disclosure may further contain a third additive, if necessary, in order to prevent the decomposition of the electrolyte in a high-voltage environment, which causes electrode collapse, and further improve low-temperature high-rate discharge characteristics, high-temperature stability, overcharge prevention, a battery expansion suppressing effect at high temperatures, etc.

The third additive may be one or more selected from a cyclic carbonate-based compound, a halogen-substituted carbonate-based compound, a sultone-based compound, a sulfate-based compound, a phosphate-based or phosphite-based compound, a nitrile-based compound, an amine-based compound, a silane-based compound, a benzene-based compound, or lithium salt-based compounds.

The cyclic carbonate-based compound may be one or more selected from vinylene carbonate (VC) or vinyl ethylene carbonate (VEC), and may be specifically vinylene carbonate.

The halogen-substituted carbonate-based compound may be fluoroethylene carbonate (FEC).

The sultone-based compound is a material capable of forming a stable SEI film by a reduction reaction on the surface of the negative electrode, and may be one or more compounds selected from the group consisting of 1,3-propane sultone (PS), 1,4-butane sultone, ethane sultone, 1,3-propene sultone (PRS), 1,4-butene sultone, and 1-methyl-1,3-propene sultone, specifically 1,3-propane sultone (PS).

The sulfate-based compound is a material which electrically decomposed on the surface of the negative electrode to form a stable SEI film that does not crack even when stored at a high temperature, and may be one or more selected from ethylene sulfate (Esa), trimethylene sulfate (TMS), or methyl trimethylene sulfate (MTMS).

The phosphate-based or phosphite-based compound may be one or more selected from lithium difluoro(bisoxalato)

phosphate, lithium difluorophosphate, tris(trimethyl silyl) phosphate, tris(trimethyl silyl)phosphite, tris(2,2,2-trifluoroethyl)phosphate or tris(trifluoroethyl)phosphite.

The nitrile-based compound may be one or more selected from succinonitrile (SN), adiponitrile (ADN), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, ethylene glycol bis(2-cyanoethyl) ether (ASA3), 1,3,6-hexane tricarbonitrile (HTCN), 1,4-dicyano 2-butene (DCB) or 1,2,3-tris(2-cyanoethyl)propane (TCEP).

The amine-based compound may be one or more selected from triethanolamine or ethylenediamine, and the silane-based compound may be tetravinylsilane.

The benzene-based compound may be one or more selected from monofluorobenzene, difluorobenzene, trifluorobenzene, or tetrafluorobenzene.

The lithium salt-based compound is a compound different from the lithium salt contained in the non-aqueous electrolyte, and may be one or more compounds selected from lithium difluorophosphate (LiDFP; $LiPO_2F_2$), lithium bisoxalatoborate (LiBOB; $LiB(C_2O_4)_2$), lithium tetrafluoroborate ($LiBF_4$), lithium tetraphenylborate, or lithium difluoro (bisoxalato)phosphate (LiDFOP).

Preferably, the non-aqueous electrolyte according to an embodiment of the present disclosure may further include one or more third additives selected from vinylene carbonate (VC), vinyl ethylene carbonate (VEC), fluoro ethylene carbonate (FEC), 1,3-propane sultone (PS), 1,3-propene sultone (PRS), ethylene sulfate (ESa), succinonitrile (SN), adiponitrile (ADN), ethylene glycol bis(2-cyanoethyl) ether (ASA3), 1,3,6-hexane tricarbonitrile (HTCN), 1,4-dicyano 2-butene (DCB), 1,2,3-tris(2-cyanoethyl)propane (TCEP), lithium difluoro oxalatoborate (LiDFOB)), lithium tetrafluoroborate ($LiBF_4$), lithium difluoro(bisoxalato)phosphate (LiDFOP), or lithium difluorophosphate (LiDFP).

More preferably, the non-aqueous electrolyte according to an embodiment of the present disclosure may further include one or more third additives selected from vinylene carbonate (VC), fluoro ethylene carbonate (FEC), 1,3-propane sultone (PS), ethylene sulfate (ESa), succinonitrile (SN), lithium tetrafluoroborate ($LiBF_4$), lithium difluoro oxalatoborate (LiDFOB), or lithium difluorophosphate (LiDFP). In this case, there is a synergistic effect of improving ion transport characteristics and cycle performance through dense film formation on the negative electrode and the positive electrode as well as the film formation effect according to the first and second additives, and suppressing side reactions at high temperatures.

Meanwhile, the content of the third additive may be in a range of 0.1 wt % to 10 wt %, preferably 0.2 wt % to 2 wt %, based on the total weight of the non-aqueous electrolyte. When the content of the third additive is within the above range, there is an effect of suppressing side reactions through the formation of a dense film on the positive electrode and the negative electrode and increasing the long-term durability of the battery.

(3) Organic Solvent

The non-aqueous electrolyte of the present disclosure includes an organic solvent.

As the organic solvent, various organic solvents commonly used in lithium electrolytes may be used without limitation. For example, the organic solvent may be a cyclic carbonate-based solvent, a linear carbonate-based solvent, a linear ester-based solvent, a cyclic ester-based solvent, a nitrile-based solvent, or a mixture thereof, preferably mixtures of a cyclic carbonate-based solvent and a linear carbonate-based solvent.

The cyclic carbonate-based solvent is a high-viscosity organic solvent and has a high dielectric constant, so that lithium salts in the electrolyte can be well dissociated, and may include one or more selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and preferably ethylene carbonate (EC) or propylene carbonate (PC).

In addition, the linear carbonate-based solvent is an organic solvent having a low viscosity and a low dielectric constant, and may be one or more selected from the group consisting of dimethyl carbonate (DMC), diethyl carbonate (DEC), dipropyl carbonate, ethyl methyl carbonate (EMC), methylpropyl carbonate and ethylpropyl carbonate, preferably may include ethyl methyl carbonate (EMC), dimethyl carbonate (DMC), or diethyl carbonate (DEC).

The organic solvent is preferably a mixture of a cyclic carbonate-based solvent and a linear carbonate-based solvent in order to prepare an electrolyte having high ionic conductivity.

The linear ester-based solvent may be one or more selected from methyl acetate, ethyl acetate, propyl acetate, methyl propionate, ethyl propionate, propyl propionate and butyl propionate, preferably methyl propionate, ethyl propionate or propyl propionate.

The cyclic ester-based solvent may be one or more selected from γ-butyrolactone, γ-valerolactone, γ-caprolactone, σ-valerolactone or ε-caprolactone.

The nitrile-based solvent may be one or more selected from succinonitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile or 4-fluorophenylacetonitrile, preferably succinonitrile.

In the total weight of the non-aqueous electrolyte, excluding all components other than the organic solvent, for example, the first additive represented by Chemical Formula 1, the second additive represented by Chemical Formula 2, the third additive and the lithium salt, the remainder may be an organic solvent unless otherwise specified.

(4) Lithium Salt

The non-aqueous electrolyte of the present disclosure includes a lithium salt.

As the lithium salt, those commonly used in electrolytes for lithium secondary batteries may be used without limitation, specifically, the lithium salt may include $Li^+$ as a cation, and one or more selected from $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $ASF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $BF_2C_2O_4CHF$—, $PF_4C_2O_4^-$, $PF_2C_4O_8^-$, $PO_2F_2^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$ or $SCN^-$ as anions.

Specifically, the lithium salt may be one or more selected from $LiPF_6$, $LiClO_4$, $LiBF_4$, $LiN(FSO_2)_2$(LiFSI), LiTFSI, lithium bis(pentafluoroethanesulfonyl)imide (LiBETI), $LiSO_3CF_3$, $LiPO_2F_2$, lithium bis(oxalate)borate (LiBOB), lithium difluoro(oxalate) borate (LiFOB), lithium difluoro (bisoxalato)phosphate (LiDFOP), lithium tetrafluoro(oxalate)phosphate (LiTFOP), or lithium fluoromalonato (difluoro) borate (LiFMDFB), preferably $LiPF_6$.

In one embodiment of the present disclosure, the concentration of the lithium salt in the non-aqueous organic solution including the lithium salt and the organic solvent may be 0.5 M to 4.0 M, specifically 0.5 M to 3.0 M, more specifically 0.8M to 2.0 M. When the concentration of the lithium salt is within the above range, it is possible to obtain an appropriate electrolyte impregnation property by preventing the viscosity and surface tension from becoming excessively high while sufficiently securing the effect of improving low-temperature output and improving cycle characteristics.

Positive Electrode

A lithium secondary battery according to the present disclosure includes a positive electrode including a positive electrode active material including a lithium composite transition metal oxide having a nickel content of 70 mol % or more among a total transition metal content.

In the case of a high-Ni positive electrode active material having a high nickel content of 70 mol % or more among the total transition metal content, since the positive electrode active material is structurally unstable, disintegration and cracking of the positive electrode active material may occur at high temperatures and high potentials. In the case of an active material that disintegrates in this way, as the surface area increases, the number of sites where a side reaction with the electrolyte can occur increases, thereby generating a large amount of gas when exposed to high temperature/high potential. When the gas is continuously generated as described above, the internal pressure of the battery increases and a vent occurs early, and the battery stops working before the lifespan of the battery is exhausted, so it is important to improve these side reactions and gas generation, which may be improved by strengthening the film formation through the non-aqueous electrolyte including the first and second additives of the present disclosure.

In one embodiment of the present disclosure, the lithium composite transition metal oxide may be represented by the following Chemical Formula 3.

[Chemical Formula 3]

$$Li_{1+x}(Ni_aCo_bMn_cM_d)O_2$$

wherein,

M is one more selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and $0 \le x \le 0.2$, $0.70 \le a < 1$, $0 < b \le 0.25$, $0 < c \le 0.25$, $0 \le d \le 0.1$, $a+b+c+d=1$.

Preferably, a, b, c and d may be $0.80 \le a \le 0.95$, $0.025 \le b \le 0.15$, $0.025 \le c \le 0.15$, and $0 \le d \le 0.05$, respectively.

The positive electrode according to the present disclosure may be manufactured by coating a positive electrode slurry including a positive electrode active material, a binder, a conductive material, and a solvent on a positive electrode current collector, followed by drying and rolling.

The positive electrode current collector is not particularly limited as long as it has conductivity without causing a chemical change in the battery, and for example, stainless steel; aluminum; nickel; titanium; calcinated carbon; or aluminum or stainless steel surface-treated with carbon, nickel, titanium, silver, etc. may be used.

The positive electrode active material may be present in an amount of 80 wt % to 99 wt %, specifically, 90 wt % to 99 wt %, based on the total weight of solids in the negative electrode slurry. At this time, when the content of the positive electrode active material is 80 wt % or less, energy density may be lowered, and thus capacity may be lowered.

The binder is a component that assists in bonding of the active material and the conductive material and bonding to the current collector, and may be added in an amount of 1 wt % to 30 wt %, based on the total weight of solids in the positive electrode slurry. Examples of such binders may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer, a sulfonated ethylene-propylene-diene monomer, styrene-butadiene rubber, fluororubber, and various copolymers thereof.

In addition, the conductive material is a material that imparts conductivity without causing a chemical change to the battery, and may be added in an amount of 0.5 wt % to 20 wt % based on the total weight of solids in the positive electrode slurry.

The conductive material may include, for example, carbon black such as acetylene black, Ketjen black, channel black, furnace black, lamp black and thermal black; graphite powders such as natural graphite, artificial graphite, carbon nanotubes and graphite; conductive fibers such as carbon fibers and metal fibers; conductive powders such as carbon fluoride powder, aluminum powder, and nickel powder; conductive whiskers such as zinc oxide and potassium titanate; conductive metal oxides such as titanium oxide; and conductive materials such as polyphenylene derivatives.

In addition, the solvent of the positive electrode slurry may include an organic solvent such as N-methyl-2-pyrrolidone (NMP), and may be used in an amount having a desirable viscosity when the positive electrode active material, a binder, and a conductive material are included. For example, it may be included so that the solids concentration in the positive electrode slurry including the positive electrode active material, the binder, and the conductive material is in a range of 40 wt % to 90 wt %, preferably 50 wt % to 80 wt %.

Negative Electrode

The lithium secondary battery according to the present disclosure includes a negative electrode including a negative electrode active material, and the negative electrode may be manufactured by coating a negative electrode slurry including a negative electrode active material, a binder, a conductive material and a solvent on a negative electrode current collector, followed by drying and rolling.

The negative electrode current collector generally has a thickness of 3 μm to 500 μm. The negative electrode current collector is not particularly limited as long as it has conductivity without causing a chemical change in the battery, and for example, stainless steel; aluminum; nickel; titanium; calcinated carbon; or copper or stainless steel surface-treated with carbon, nickel, titanium, silver, etc.; or an aluminum-cadmium alloy may be used. In addition, like the positive electrode current collector, fine irregularities may be formed on a surface of the negative electrode current collector to strengthen the adhesion with the negative electrode active material, and may take various forms such as films, sheets, foils, nets, porous materials, foams, non-woven materials, etc.

In addition, the negative electrode active material may include a carbon material capable of reversibly intercalating/deintercalating lithium ions; metals or alloys of these metals and lithium; metal composite oxides; materials capable of doping and dedoping lithium; lithium metal; and one or more selected from transition metal oxides.

As a carbon material capable of reversibly intercalating/deintercalating lithium ions, any carbon-based negative active material generally used in lithium ion secondary batteries may be used without particular limitation, and a representative example thereof is crystalline carbon, amorphous carbon or these may be used together. Examples of the crystalline carbon include graphite such as amorphous, plate-like, flake, spherical or fibrous natural graphite and artificial graphite, and examples of the amorphous carbon include soft carbon (soft carbon: low-temperature calcined carbon), hard carbon, mesophase pitch carbide, calcined coke, etc.

Examples of the above metals or alloys of these metals with lithium include metals selected from the group consisting of Cu, Ni, Na, K, Rb, Cs, Fr, Be, Mg, Ca, Sr, Si, Sb, Pb, In, Zn, Ba, Ra, Ge, Al, and Sn or an alloy of these metals and lithium.

Examples of the metal composite oxide include one or more selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3(0 \leq x \leq 1)$, $Li_xWO_2(0 \leq x \leq 1)$ and $Sn_xMe_{1-x}Me'_yO_z$ (Me: Mn, Fe, Pb, Ge; Me': Al, B, P, Si, elements of groups 1, 2 and 3 of the periodic table, halogens; $0<x\leq 1$; $1\leq y\leq 3$; $1\leq z\leq 8$).

Examples of the material capable of doping and dedoping lithium include Si, $SiO_x$ ($0<x<2$), an Si—Y alloy (wherein Y is an element selected from the group consisting of alkali metals, alkaline earth metals, group 13 elements, group 14 elements, transition metals, rare earth elements and combinations thereof, but is not Si), Sn, $SnO_2$, Sn—Y (wherein Y is an element selected from the group consisting of alkali metals, alkaline earth metals, group 13 elements, group 14 elements, transition metals, rare earth elements, and combinations thereof and is not Sn), and one or more of these and $SiO_2$ may be mixed and used. The element Y may be selected from the group consisting of Mg, Ca, Sr, Ba, Ra, Sc, Y, Ti, Zr, Hf, Rf, V, Nb, Ta, Db(dubnium), Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

Examples of the transition metal oxide include a lithium-containing titanium composite oxide (LTO), vanadium oxide, lithium vanadium oxide, etc.

In one embodiment of the present disclosure, the negative active material may include graphite.

The negative active material may be present in an amount of 80% to 99 wt % based on the total weight of the solids in the negative electrode slurry.

The binder is a component that assists in bonding between the conductive material, the active material, and the current collector, and may typically be added in an amount of 1 wt % to 30 wt %, based on the total weight of the solids in the negative electrode slurry. Examples of such binders may include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer, a sulfonated ethylene-propylene-diene monomer, styrene-butadiene rubber, fluororubber, and various copolymers thereof.

The conductive material is a component for further improving the conductivity of the negative electrode active material, and may be added in an amount of 0.5 wt % to 20 wt % based on the total weight of the solids in the negative electrode slurry. The conductive material is not particularly limited as long as it has conductivity without causing a chemical change in the battery, for example, may include carbon black such as acetylene black, Ketjen black, channel black, furnace black, lamp black and thermal black; graphite powder, such as natural graphite, artificial graphite, carbon nanotubes, and graphite with a highly developed crystal structure; conductive fibers such as carbon fibers and metal fibers; conductive powders such as carbon fluoride powder, aluminum powder, and nickel powder; conductive whiskers such as zinc oxide and potassium titanate; conductive metal oxides such as titanium oxide; or conductive materials such as a polyphenylene derivative.

The solvent of the negative electrode slurry may include water; or an organic solvent such as NMP and alcohol, and may be used in an amount to achieve a desirable viscosity when the negative active material, binder, and conductive material are included. For example, it may be included so that the solids concentration in the slurry including the negative electrode active material, the binder, and the conductive material is in a range of 30 wt % to 80 wt %, preferably 40 wt % to 70 wt %.

Separator

The lithium secondary battery according to the present disclosure includes a separator between the positive electrode and the negative electrode.

The separator separates the negative electrode and the positive electrode and provides a passage for lithium ions to move, and may be used without any particular limitation as long as it is normally used as a separator in a lithium secondary battery, in particular, it is preferable to use an electrolyte that has a low resistance to ion movement and an excellent electrolyte impregnating ability and stability.

Specifically, a porous polymer film as a separator, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer; or a laminated structure including two or more layers of these materials may be used. In addition, a conventional porous nonwoven fabric, for example, a nonwoven fabric made of high melting point glass fiber, polyethylene terephthalate fiber, etc. may be used. In addition, a coated separator including a ceramic component or a polymer material may be used to secure heat resistance or mechanical strength, and may be used in a single-layer or multi-layer structure.

The lithium secondary battery according to the present disclosure as described above is usefully used in the field of a portable device such as a mobile phone, a notebook computer, a digital camera; and an electric vehicle field such as a hybrid electric vehicle (HEV).

Accordingly, according to another embodiment of the present disclosure, a battery module including the lithium secondary battery as a unit cell and a battery pack including the same are provided.

The battery module or battery pack may be used as a power source for a power tool; electric vehicles, including electric vehicles (EVs), hybrid electric vehicles, and plug-in hybrid electric vehicles (PHEVs); and one or more medium and large-sized devices of a system for power storage.

The external shape of the lithium secondary battery of the present disclosure is not particularly limited, but may be a cylindrical type using a can, a prismatic type, a pouch type, or a coin type.

The lithium secondary battery according to the present disclosure may be used in a battery cell used as a power source of a small device, or may also be preferably used as a unit cell of a medium or large battery module including a plurality of battery cells.

Hereinafter, the present disclosure will be described in more detail through specific examples.

EXAMPLES

Example 1

(Preparation of Non-Aqueous Electrolyte)

Ethylene carbonate (EC):dimethyl carbonate (DMC) was mixed in a volume ratio of 30:70, and then $LiPF_6$ was dissolved to 1.2M to prepare a non-aqueous organic solution. 0.5 wt % of the compound represented by Chemical Formula 1A, 0.5 wt % of the compound represented by Chemical Formula 2A, 1 wt % of vinylene carbonate (VC), 1 wt % of 1,3-propane sultone (PS), and the remainder as the non-aqueous organic solution were mixed to prepare 100 wt % of a non-aqueous electrolyte.

Manufacture of Lithium Secondary Battery $LiNi_{0.8}Co_{0.1}Mn_{0.1}O_2$ as a positive electrode active material, a conductive material (carbon black), and a binder (polyvinylidene fluoride) were added to N-methyl-2-pyrrolidone (NMP) in a weight ratio of 98:1:1 to prepare a positive electrode slurry (solids content: 60 wt %). The positive electrode slurry was applied on a 13.5 μm-thick aluminum (Al) thin film as a positive electrode current collector and dried, and then roll pressing was performed to manufacture a positive electrode.

A negative electrode active material (graphite), binder (SBR-CMC) and conductive material (carbon black) were added to water as a solvent in a weight ratio of 97.6:2.2:0.2 to prepare a negative electrode slurry (solids content: 60 wt %). The negative electrode slurry was applied on a 6 μm-thick copper (Cu) thin film as a negative electrode current collector and dried, and then roll pressing was performed to manufacture a negative electrode.

An electrode assembly was prepared by sequentially stacking the positive electrode, a polyolefin-based porous separator coated with inorganic mineral particles ($Al_2O_3$), and the negative electrode.

A lithium secondary battery was manufactured by accommodating the assembled electrode assembly in a pouch-type battery case, and injecting the prepared non-aqueous electrolyte.

Example 2

A lithium secondary battery was prepared in the same manner as in Example 1, except that the content of the compound represented by Chemical Formula 1A was changed to 1.0 wt % during the preparation of the non-aqueous electrolyte.

Example 3

A lithium secondary battery was prepared in the same manner as in Example 1, except that the content of the compound represented by Chemical Formula 2A was changed to 1.0 wt % during the preparation of the non-aqueous electrolyte.

Example 4

A lithium secondary battery was prepared in the same manner as in Example 1, except that the content of the compound represented by Chemical Formula 1A was changed to 1.0 wt % and the content of the compound represented by Chemical Formula 2A was changed to 1.0 wt % during the preparation of the non-aqueous electrolyte.

Example 5

A lithium secondary battery was prepared in the same manner as in Example 1, except that the content of the compound represented by Chemical Formula 1A was changed to 2.0 wt % and the content of the compound represented by Chemical Formula 2A was changed to 2.0 wt % during the preparation of the non-aqueous electrolyte.

Comparative Example 1

A lithium secondary battery was prepared in the same manner as in Example 1, except that the compound represented by Chemical Formula 1A and the compound represented by Chemical Formula 2A were not added during the preparation of the non-aqueous electrolyte.

Comparative Example 2

A lithium secondary battery was prepared in the same manner as in Example 1, except that the compound represented by Chemical Formula 2A was not added during the preparation of the non-aqueous electrolyte.

Comparative Example 3

A lithium secondary battery was prepared in the same manner as in Example 1, except that the compound represented by Chemical Formula 1A was not added during the preparation of the non-aqueous electrolyte.

Experimental Examples

Experimental Example 1. Measurement of Reduction Potential

A non-aqueous organic solution was prepared by mixing ethylene carbonate (EC) and dimethyl carbonate (DMC) in a volume ratio of 20:80 and then dissolving $LiPF_6$ in the mixture so as to be 1.0 M. A non-aqueous electrolyte was prepared by mixing 1 g of the compound represented by Chemical Formula 1A and 99 g of the non-aqueous organic solution.

The above-prepared non-aqueous electrolyte solution was injected into 2032 coin cell having a structure in which a polyethylene (PE) separator is interposed between a graphite electrode and a lithium foil electrode. Then, the potential at which the compound represented by Chemical Formula 1A is decomposed was measured while lithium ions were intercalated into the graphite electrode until the potential of the graphite electrode reached 0.05 V.

The measured value is shown in Table 1 below as a reduction potential range, which is a potential versus Li reference electrode.

The reduction potential range of the compound represented by Formula 2A was also measured in the same manner and is shown in Table 1 below.

TABLE 1

| | Reduction Potential Range |
|---|---|
| Formula 1A | 1.1 V~1.3 V |
| Formula 2A | 1.5 V~1.7 V |

Experimental Example 2. Evaluation of Gas Generation Amount

After activating the lithium secondary batteries manufactured in Example and Comparative Examples at 0.2 C CC at 25° C., respectively, degassing was performed. Then, after aging at room temperature, it was charged at 0.33 C CC/CV to 4.20V, and then stored at 70° C. for 4 weeks. After high-temperature storage, the amount of gas generated in the lithium secondary battery, such as CO and $CO_2$, was measured, and when the gas generation amount measured in Comparative Example 1 was 100%, the relative gas generation amount of each battery was calculated and shown in Table 2 below.

Experimental Example 3. Voltage Drop Evaluation

After activating the lithium secondary batteries manufactured in Example and Comparative Examples at 0.1 C CC, respectively, degassing was performed. Then, an open circuit voltage (OCV, mV) at 25° C. was measured, and after the battery was stored at 60° C. for 8 weeks, the OCV was measured again. The difference in OCV values (dOCV) before and after high-temperature storage is shown in Table 2 below.

TABLE 2

| | Chemical Formula 1A (wt %) | Chemical Formula 2A (wt %) | Experimental Example 2: Gas generation (%) | Experimental Example 3: dOCV (mV) |
|---|---|---|---|---|
| Example 1 | 0.5 | 0.5 | 78 | 100 |
| Example 2 | 1.0 | 0.5 | 73 | 92 |
| Example 3 | 0.5 | 1.0 | 75 | 96 |
| Example 4 | 1.0 | 1.0 | 71 | 90 |
| Example 5 | 2.0 | 2.0 | 65 | 77 |
| Comparative Example 1 | — | — | 100 | 115 |
| Comparative Example 2 | 0.5 | — | 82 | 111 |
| Comparative Example 3 | — | 0.5 | 95 | 106 |

Through the results of Table 1, it can be seen that in the battery of Examples 1 to 5 using the electrolyte including both the first additive represented by Chemical Formula 1 and the second additive represented by Formula 2, a smaller amount of gas generation and a smaller decrease in OCV were measured after high temperature storage compared to the batteries of Comparative Examples 1 to 3, despite including a high-nickel positive electrode active material.

Specifically, it can be confirmed that in the battery of Examples 4 and 5 in which the content of the first additive and the content of the second additive are each 1 wt % or more, a smaller amount of gas generation and a smaller decrease in OCV were measured. More specifically the smallest amount of gas generation and the smallest decrease in OCV were measured in Example 5.0n the other hand, in the battery of Comparative Examples 1 to 3 using the electrolyte containing neither the first additive nor the second additive, the electrolyte containing only the first additive, and the electrolyte containing only the second additive, respectively, a greater amount of gas generation and a greater decrease in OCV were measured after high temperature storage compared to the battery of Example 1.

What is claimed is:

1. A lithium secondary battery comprising:

a non-aqueous electrolyte solution comprising a lithium salt, an organic solvent, a first additive represented by Chemical Formula 1A and a second additive represented by Chemical Formula 2;

a positive electrode comprising a positive electrode active material comprising a lithium composite transition metal oxide having a nickel content of 70 mol % or more among a total transition metal content;

a negative electrode comprising a negative electrode active material; and a separator interposed between the positive electrode and the negative electrode,

[Chemical Formula 1A]

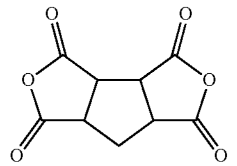

[Chemical Formula 2]

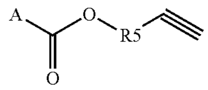

wherein,

A is —NR3R4, a nitrogen-containing heterocyclic group having 3 to 5 carbon atoms or a nitrogen-containing heteroaryl group having 3 to 5 carbon atoms, R3 and R4 are each independently an alkyl group having 1 to 5 carbon atoms, and R5 is an alkylene group having 1 to 3 carbon atoms, wherein a content of the first additive is in a range of 0.01 wt % to 5 wt % based on a total weight of the non-aqueous electrolyte solution, and a content of the second additive is in a range of 0.01 wt % to 5 wt % based on the total weight of the non-aqueous electrolyte solution, and wherein the non-aqueous electrolyte solution further comprises a third additive selected from vinylene carbonate (VC), fluoro ethylene carbonate (FEC), 1,3-propane sultone (PS), ethylene sulfate (ESa), succinonitrile (SN), lithium tetrafluoroborate ($LiBF_4$), lithium difluoro oxalatoborate (LiDFOB), lithium difluoro phosphate (LiDFP), or a combination thereof, and a content of the third additive is in a range of 0.2 wt % to 2 wt % based on the total weight of the non-aqueous electrolyte solution.

2. The lithium secondary battery of claim 1, wherein the second additive is represented by Chemical Formula 2-1 or 2-2:

[Chemical Formula 2-1]

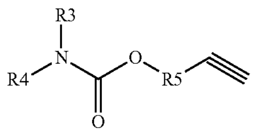

-continued

[Chemical Formula 2-2]

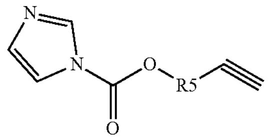

wherein,

R3 to R5 are as defined in Chemical Formula 2.

3. The lithium secondary battery of claim 1, wherein in Chemical Formula 2, A is a nitrogen-containing heteroaryl group having 3 to 5 carbon atoms.

4. The lithium secondary battery of claim 1, wherein the content of the first additive and the content of the second additive are each in a range of 1 wt % or more and 5 wt % or less based on the total weight of the non-aqueous electrolyte solution.

5. The lithium secondary battery of claim 1, wherein the organic solvent comprises a mixture of a cyclic carbonate-based solvent and a linear carbonate-based solvent.

6. The lithium secondary battery of claim 1, wherein the lithium composite transition metal oxide is represented by Chemical Formula 3:

[Chemical Formula 3]

$$Li_{1+x}(Ni_aCo_bMn_cM_d)O_2$$

wherein,

M is at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and $0 \leq x \leq 0.2$, $0.70 \leq a < 1$, $0 < b \leq 0.25$, $0 < c < 0.25$, $0 \leq d < 0.1$, and $a+b+c+d=1$.

7. The lithium secondary battery of claim 6, wherein a, b, c, and d of Formula 3 are $0.80 \leq a \leq 0.95$, $0.025 \leq b \leq 0.15$, $0.025 \leq c \leq 0.15$, and $0 \leq d \leq 0.05$, respectively.

8. The lithium secondary battery of claim 1, wherein the second additive is represented by Chemical Formula 2A.

[Chemical Formula 2A]

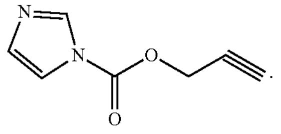

9. A lithium secondary battery comprising:

a non-aqueous electrolyte solution comprising a lithium salt, an organic solvent, a first additive represented by Chemical Formula 1, a second additive represented by Chemical Formula 2, and a third additive selected from vinylene carbonate (VC), fluoro ethylene carbonate (FEC), 1,3-propane sultone (PS), ethylene sulfate (ESa), succinonitrile (SN), lithium tetrafluoroborate ($LiBF_4$), lithium difluoro oxalatoborate (LiDFOB), lithium difluoro phosphate (LiDFP), or a combination thereof;

a positive electrode comprising a positive electrode active material comprising a lithium composite transition metal oxide having a nickel content of 70 mol % or more among a total transition metal content;

a negative electrode comprising a negative electrode active material; and a separator interposed between the positive electrode and the negative electrode,

[Chemical Formula 1]

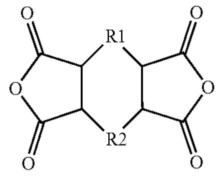

wherein,

R1 and R2 are each independently a direct bond; or an alkylene group having 1 to 5 carbon atoms;

[Chemical Formula 2]

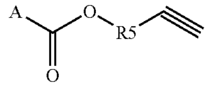

wherein,

A is —NR3R4, a nitrogen-containing heterocyclic group having 3 to 5 carbon atoms or a nitrogen-containing heteroaryl group having 3 to 5 carbon atoms, R3 and R4 are each independently an alkyl group having 1 to 5 carbon atoms, and R5 is an alkylene group having 1 to 3 carbon atoms, wherein a content of the first additive, and a content of the second additive are each in a range of 1 wt % or more and 5 wt % or less based on the total weight of the non-aqueous electrolyte solution, and a content of the third additive is in a range of 0.2 wt % to 2 wt % based on a total weight of the non-aqueous electrolyte solution.

10. The lithium secondary battery of claim 9, wherein the second additive is represented by Chemical Formula 2-1 or 2-2:

[Chemical Formula 2-1]

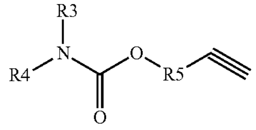

[Chemical Formula 2-2]

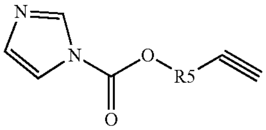

wherein,

R3 to R5 are as defined in Chemical Formula 2.

11. The lithium secondary battery of claim 9, wherein in Chemical Formula 1, R1 is a direct bond, and R2 is an alkylene group having 2 to 5 carbon atoms.

12. The lithium secondary battery of claim 9, wherein in Chemical Formula 2, A is a nitrogen-containing heteroaryl group having 3 to 5 carbon atoms.

13. The lithium secondary battery of claim 9, wherein the organic solvent comprises a mixture of a cyclic carbonate-based solvent and a linear carbonate-based solvent.

14. The lithium secondary battery of claim 9, wherein the lithium composite transition metal oxide is represented by Chemical Formula 3:

$Li_{1+x}(Ni_aCo_bMn_cM_d)O_2$ [Chemical Formula 3]

wherein,

M is at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and $0 \le x \le 0.2$, $0.70 \le a < 1$, $0 < b \le 0.25$, $0 < c \le 0.25$, $0 \le d \le 0.1$, and $a+b+c+d=1$.

15. The lithium secondary battery of claim 14, wherein a, b, c, and d of Formula 3 are $0.80 \le a \le 0.95$, $0.025 \le b \le 0.15$, $0.025 \le c \le 0.15$, and $0 \le d \le 0.05$, respectively.

16. The lithium secondary battery of claim 9, wherein the second additive is represented by Chemical Formula 2A

[Chemical Formula 2A]

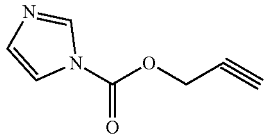

.

* * * * *